April 23, 1968
J. C. WHITING
3,379,206
DIFFERENTIAL PRESSURE INDICATING AND FLUID BYPASS DEVICE
Filed June 9, 1965
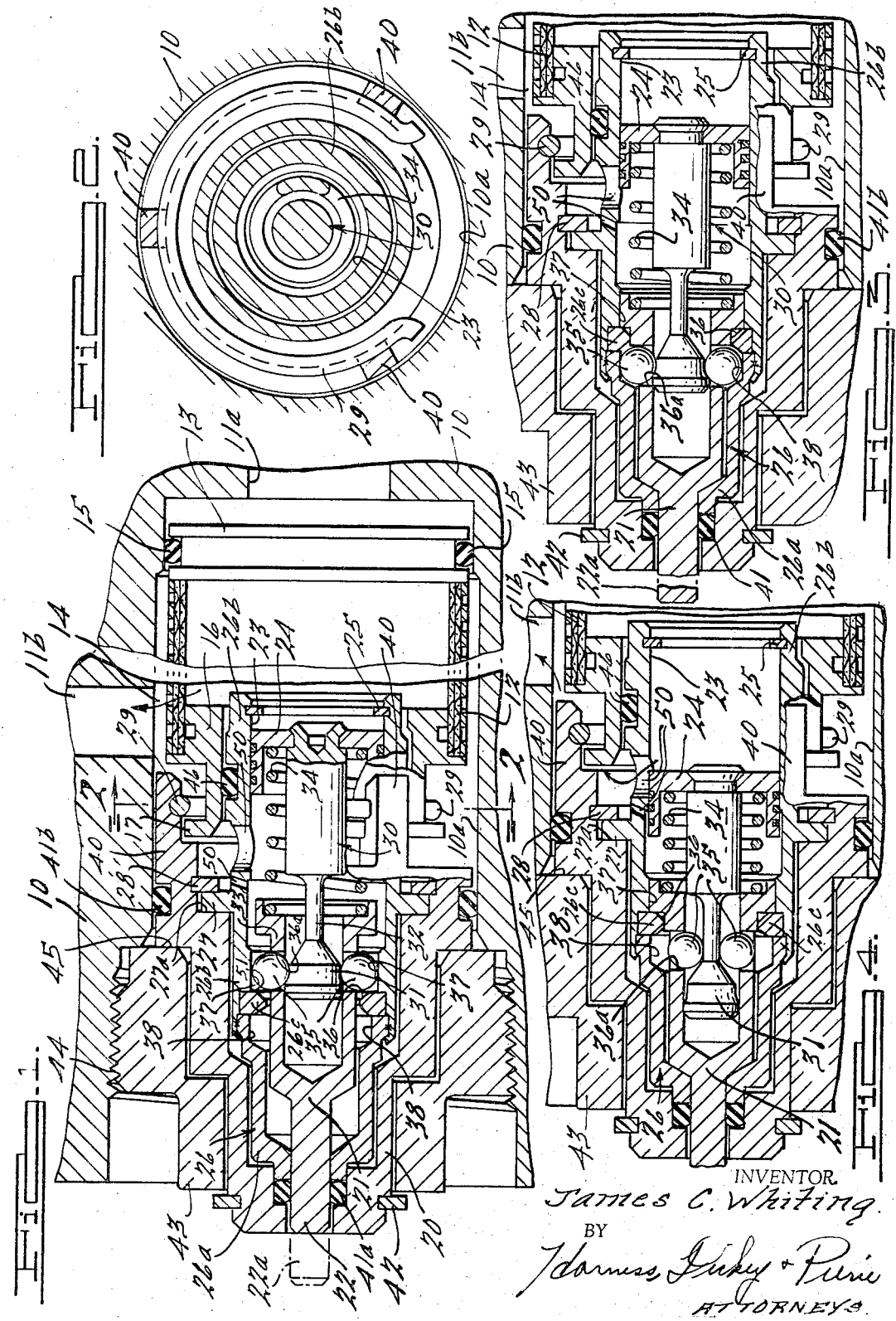
INVENTOR.
James C. Whiting
BY
Harness, Dickey & Pierce
ATTORNEYS United States Patent Office 3,379,206
Patented Apr. 23, 1968

3,379,206
DIFFERENTIAL PRESSURE INDICATING AND
FLUID BYPASS DEVICE
James C. Whiting, Royal Oak, Mich., assignor to Michigan-Dynamics, Inc., Detroit, Mich., a corporation of Michigan
Filed June 9, 1965, Ser. No. 462,508
2 Claims. (Cl. 137—110)

ABSTRACT OF THE DISCLOSURE

A differential pressure indicating device of the type in which a pressure responsive piston is exposed to fluid pressures on opposite sides thereof upstream and downstream, respectively, of a filter. Downstream pressure is assisted by a spring which is seated against a signal member and when the spring is compressed against the signal member, spring and piston are released for joint movement to a position in which the signal member indicates a clogged filter condition. Once the signal member is in its indicating position, further movement of the piston against the spring will expose a bypass opening to permit fluid to flow around the filter and prevent too great a pressure drop across the filter.

---

This invention relates to pressurized fluid systems and particularly to a combined differential pressure indicating and fluid bypass device.

The device of the present invention is adapted for use with a substantially conventional filter and becomes operative when the filter is sufficiently clogged with dirt or other contaminants as to require cleaning or replacement. The device functions, first, to give a signal when a predetermined pressure drop occurs across the filter and, second, to open a bypass for the flow of fluid around the filter at a somewhat greater pressure drop across the filter.

While the commercial uses to which the present invention is applicable are numerous and widespread, a typical use is found in connection with the hydraulic power systems of machine tools and other pressurized fluid systems of industrial machinery. As stated, the device of this invention may be attached to a substantially conventional filter or strainer which is illustratively shown as being of a hollow cylindrical shape with fluid flowing radially outwardly therethrough.

The various objects of this invention are attained by a piston-actuated device which compares the pressure of fluid on the upstream and downstream sides of the filter. When a substantial pressure drop is sensed, the differential pressures acting on the piston move it against the force of a spring. Movement of the piston first actuates a detent or latch to release a signal element and thereby indicate the necessity of correcting the condition producing the pressure drop. If this condition is not corrected, as by cleaning or changing of the filter, a further buildup of contaminants on the filter will produce an even greater pressure drop across the filter. This results in continued movement of the piston against the spring until the piston exposes a bypass for the flow of fluid around the filter. The provision of a unitary device capable of functioning to first release a signal and thereafter open a bypass comprises a principal object of the present invention.

Other objects of the present invention include the provision of a device of the foregoing character which is reliable in operation, which possesses a high degree of accuracy, which is reasonable in cost, which is compact in size, which is easily serviced and which is not subject to resetting without disassembly.

The various objects and advantages and novel details of construction of one commercially practical embodiment of the invention will become apparent as this description proceeds, especially when considered in connection with the accompanying drawings, in which:

FIGURE 1 is a longitudinal sectional view of the device of this invention attached to a fragmentarily illustrated filter element, the parts being in their normal positions;

FIGURE 2 is a sectional view of the structure illustrated in FIGURE 1 taken along the line 2—2 thereof;

FIGURE 3 is a view of a portion of the structure illustrated in FIGURE 1 with the parts shown in a second position; and FIGURE 4 is a view of the structure illustrated in FIGURE 3 with the parts being shown in a third position.

The reference character 10 indicates a filter housing having a chamber 10a and an inlet opening 11a through which fluid is admitted to the chamber 10a. The housing 10 also has an outlet opening 11b through which filtered fluid leaves the chamber 10a.

The reference character 12 identifies a typical filter element which is shown as being of generally hollow cylindrical configuration and open at its end. The fluid to be filtered enters the space within the filter 12 from the inlet 11a at the right-hand end thereof, flows radially outwardly through the filter and then passes along an annular space 14 adjacent the wall of the chamber 10a until it reaches the outlet 11b.

The right-hand end of the filter element 12 may be provided with a sealing ring 15 engaging the housing 10 to prevent the flow of unfiltered fluid from the right-hand end of the chamber 10a to the annular space 14. The left-hand end of the filter element 12, as viewed in the figures, is fitted with a collar 16 by which the device of the present invention is attached to the filter 12. The collar 16 will be seen to have a radially out-turned annular flange 17.

The device of this invention is shown as being mounted in the housing 10 by means of a retainer member 20 which surrounds a body member 26 and holds it in place within the housing 10. Both the retainer member 20 and the body member 26 possess a generally sleeve-shaped configuration of stepped diameter. A signal member 21 is supported within the body member 26 and is guided thereby for rectilinear sliding movement in what may be termed an axial direction. The signal member 21 has an end portion 22 which is adapted to project beyond its enclosing structure, as shown at 22a, for the purpose of giving a visual warning.

It will be noted that the body member 26 is formed in three parts: a guide 26a, a cylinder 26b, and an annular shoulder 26c. The guide 26a and cylinder 26b are brazed together in such a manner as to trap the annular shoulder 26c therebetween. The cylinder 26b, which is open at its opposite ends, is located at the right-hand end of the body member 26 adjacent the space within the filter 12. The cylinder 26b has a bore 23 in which a piston 24 is slidably and sealingly mounted for exposure on its right-hand side to the pressure of the fluid medium on the inlet side of the filter 12 (that is, the fluid within the filter 12). The bore 23 is fitted with a retaining ring 25 which serves as a safety device to retain the piston 24. The body member 26 is provided with a radially outwardly extending annular flange 27 which is trapped between an annular shoulder 27a of the retainer member 20 and a snap ring 28 carried by the retainer member 20.

The device of this invention is removably attached to the collar 16 of the filter element 12 by a flexible spring-like member 29 which is segmentally ring shaped. The member 29 snaps into recesses formed in a plurality of axially extending, angularly spaced projections 40 formed on the right-hand end of the retainer member 20 and abuts the flange 17 on the collar 16.

The piston 24 has fixedly secured thereto a stem member 30 which extends axially of the device and is provided with an enlarged head 31 constituting a latch or detent locking means. The head 31 is connected to the main portion of the stem 30 by a reduced stem portion 32. Seated against the right-hand end of a sleeve portion 33 of the signal device 21 is a spring 34 which engages the piston 24 and urges it to the right against pressure of the fluid medium on the inlet side of the filter 12. However, as will be pointed out hereinafter, when the differential pressure across the filter 12 becomes sufficiently great through the accumulation of dirt and other contaminants, the piston will be moved to the left against the spring 34.

The signal device 21 is held in a normally retracted position, illustrated in full lines in FIGURE 1, by one or more detents in the form of balls 35. In the normal position of the parts illustrated in FIGURE 1, the detents 35 engage a conical or inclined annular surface 36 of the shoulder 26c; the walls of diametrically opposite ports or openings 36a within which the detents 35 lie; the head 31; and a cylindrical inner wall 37 of the body member 26 located radially outwardly of the shoulder 26c. This locks the signal member 21 in a retracted position against the bias of the spring 24.

Various seals are provided for preventing the flow of fluid out of the housing 10 past the device of the present invention. These seals include an O-ring 41a interposed between the signal member end 22 and the retainer member 20 and an O-ring 41b interposed between the retainer member 20 and the housing 10. Also, an O-ring 46 is interposed between the body member 26 and the filter collar 16 to prevent the flow of unfiltered fluid through the space between the body member cylinder portion 26b and the collar 16.

The retainer member 20 is held in place by a threaded plug 43 which is threaded into a housing thread 44. The plug 43 is provided with an annular shoulder 45 which engages a corresponding shoulder on the retainer member 20 to prevent movement of the retainer member in one axial direction. Opposite movement of the retainer member 20 is prevented by the engagement of a snap ring 42, carried by the retainer member 20, with the end of the plug 43.

The operation of the device of the present invention may be ascertained by a comparison of FIGURES 1, 2 and 3. In FIGURE 1, the parts are shown in their normal positions in which the pressure drop across the filter 12 is within permissible limits. Under such circumstances, fluid flows from the interior of filter 12 radially outwardly through the wall of the filter and thence along the space 14 to the outlet opening 11b. Fluid also flows from space 14 between the retainer member projections 40 and through openings 50 formed in the wall of the cylinder 26b. By this means, filtered fluid gains access to the left-hand side of the piston 24. Accordingly, outlet or downstream fluid pressure acts against the left-hand side of piston 24 in opposition to inlet or upstream fluid pressure acting against the right-hand side of the piston 24. The filter 12 always offers some resistance to fluid flow and therefore the pressure acting against the left-hand side of piston 24 will always be less than the pressure acting against the right-hand side of the piston 24. Thus, a differential fluid pressure will always tend to move piston 24 to the left. However, this movement is opposed by the spring 34 which is selected to be of a strength sufficient to prevent appreciable movement of the piston 24 so long as the differential pressure remains at a safe level. However, when the filter becomes excessively clogged with dirt or other contaminants and the pressure differential rises to a first preselected level (as a result of a downstream pressure drop), the combined forces on the piston 24 produced by the spring 34 and downstream fluid pressure will fail to equal the opposing force exerted on the piston by upstream or inlet fluid pressure. The piston will then move to the left, carrying the stem head 31 with it and positioning the reduced diameter stem portion 32 in radial alignment with the detents 35. When this occurs, the detents 35 will be cammed or wedged radially inwardly by the conical or sloping shoulder surface 36 and the walls of the openings 36c. It will be appreciated that fluid pressure is attempting to move the signal member 21, then stem 30, the piston 24 and the spring 34 as a unit to the left. This movement is transmitted to the detents 35 by the walls of the openings 36a. While the shoulder 26c serves to prevent movement of the signal member 21 in a left-hand direction as long as the detents 35 are in axial alignment therewith, the movement of the detents 35 radially inwardly adjacent the reduced diameter stem portion 32 places the detents 35 in a position out of alignment with the shoulder 26c and unlocks the signal member 21 for movement to an indicating or signalling position. It may be appreciated that the forces applied to the detents 35 by the pressure acting on the signal member 21 and by the spring 34 constantly attempt to cam or wedge the detents 35 radially inwardly. Normally, however, such movement is prevented by the stem head 31. The point at which the head 31 will move out of alignment of the detents 35 is selected to occur at a differential pressure across the filter 12 which is slightly less than the maximum differential which can be tolerated by the pressurized fluid system with which the filter is being used. Thus, the visual signal which is given to an operator in attendance at the machinery or to one responsible for its maintenance, enables such operator to clean or place the filter 12 prior to the attainment of an unsafe or intolerable level of pressure drop across the filter.

As illustrated in FIGURE 3, if the pump or other pressure producing source (not shown) is turned off, the signal member 21 will remain in a signalling position. When the pressure differential is interrupted, the spring 34 will move the piston 24 to the right, causing it to carry the stem head 31 with it. This will cause the head 31 to cam or wedge the detents 35 radially outwardly into a groove 38 on the left-hand side of the shoulder 26c. This fixes the detents 35 in an axial direction and the detents, in turn, hold the signal member 21 against axial withdrawal into the housing 10. The signal member is shown in this position in FIGURE 3.

It will be noted that when the differential pressure is only great enough to release the signal member 21, the right-hand end of the piston 24 is still in a position upstream or to the right of the body member openings 50. However, if the filter 12 is not cleaned or replaced after the signal is given, a further buildup of contaminant on the filter will increase the pressure drop across the filter and the piston 24 will continue to move to the left further compressing the spring 34. This additional left-hand movement of the piston 24 will expose the openings 50 at a second predetermined level of pressure drop to the unfiltered fluid on the upstream side of the filter 12. When this occurs, a bypass path for the flow of fluid around the filter 12 is created. This path extends from the interior of the filter 12 to the bore 23 through the openings 50 to the space between the retainer member projections 40, thence to the space 14 and the outlet opening 11b. By this means, a further pressure drop is avoided and a continued flow of fluid through the system is assured even though such a flow may result in the carrying of dirt or other contaminants with the fluid, it being assumed that greater damage to the machinery or parts being used in the fluid system will occur as a result of an excess pressure drop than as a result of contaminants being carried with the fluid. Because the spring 34 is used both in the actuation of the signal member 21 and in the opening of the bypass, a relatively accurate correlation will exist between the pressures at which a signal is given and the bypass is opened.

In order to reset the device of the present invention, it is necessary to disassemble the device and manually apply a force in a left-hand direction to the right-hand end of the piston 24. When this is done, the reduced diameter stem portion 32 is brought into alignment with the detents and the signal member 21 may then be manually pushed to the right in order to move the detents 35 to the right of the shoulder member 26c.

While one commercially practical embodiment of the invention has been described and illustrated herein somewhat in detail, it will be understood that various changes may be made as come within the purview of the accompanying claims.

What is claimed is:

1. A differential pressure indicating device for use in a pressurized fluid system having flow obstructing means producing a lower pressure on the downstream side thereof than on the upstream side, said device including a piston exposed to upstream and downstream fluid pressures on opposite sides thereof; a signal member movable between a retracted position and an indicating position; a spring arranged for compression between said piston and said signal member, and means carried by said piston operable to release said signal member for movement to said indicating position upon a predetermined movement of said piston toward said signal member, said spring and said piston being jointly movable with said signal member upon the movement of said signal member to said indicating position in response to the differential pressure acting thereon.

2. A combined differential pressure indicating and bypass device for use in a pressurized fluid system having flow obstructing means producing a lower pressure on the downstream side thereof than on the upstream side thereof, said device including a piston exposed to said upstream and downstream fluid pressures on opposite sides thereof; a signal member movable between a retracted position and an indicating position; a spring seated against said signal member and biasing said piston in a direction away from said signal member and against the force of upstream fluid pressure; means movable with said piston operable to release said signal member for movement to said indicating position upon a given movement of said piston toward said signal member, said piston and said spring being jointly movable with said signal member in its movement to said indicating position, and means defining a bypass opening which is normally closed by said piston but which is opened by further movement of said piston toward said signal member after said signal member is in its indicating position, said bypass opening directly communicating fluid from the upstream to the downstream side of said flow obstructing device.

References Cited

UNITED STATES PATENTS

| | | | |
|---|---|---|---|
| 2,935,040 | 5/1960 | Steensen | 116—117 |
| 2,954,751 | 10/1960 | Barnes | 116—70 |
| 2,998,138 | 8/1961 | Mould et al. | 210—90 |
| 3,011,470 | 12/1961 | Stoermer | 210—90 X |
| 3,080,972 | 3/1963 | Smith | 210—235 X |
| 3,117,550 | 1/1964 | Cole | 210—90 X |
| 3,150,633 | 9/1964 | Holl | 210—90 X |

SAMIH N. ZAHARNA, *Primary Examiner.*